United States Patent

Smith

[11] 4,015,410
[45] Apr. 5, 1977

[54] HAY OR CROP SAVING ATTACHMENT FOR MOBILE PICK-UP BALER

[76] Inventor: Palmer L. Smith, Rte. 4, Thomasville, Ga. 31792

[22] Filed: Mar. 4, 1976

[21] Appl. No.: 664,041

[52] U.S. Cl. .................................. 56/364; 56/341
[51] Int. Cl.² ................. A01D 89/00; A01D 83/00
[58] Field of Search ........................... 56/341–346, 56/364, 119, 16.4, 16.6, 1

[56] References Cited

UNITED STATES PATENTS

| | | | |
|---|---|---|---|
| 1,819,432 | 8/1931 | Mickle | 56/364 |
| 2,478,324 | 8/1949 | Russell | 56/364 |
| 3,040,508 | 6/1962 | Nolt | 56/341 |
| 3,098,340 | 7/1963 | Harrington et al. | 56/345 |
| 3,815,346 | 6/1974 | Nelson | 56/364 |
| 3,924,391 | 12/1975 | Cheatum | 56/364 |

Primary Examiner—Russell R. Kinsey
Attorney, Agent, or Firm—B. P. Fishburne, Jr.

[57] ABSTRACT

A floating cylinder or roller attachment for mobile pick-up balers is positioned slightly ahead of the rotating pick-up teeth and is held somewhat above the ground while being freely rotatable on a cross shaft. The cross shaft is held on a pair of support arms which may swing vertically and whose rear ends are pivoted to the top of the auger hood. Intermediate support for the pivoted cylinder support arms is afforded by an existing transverse bar on the baler. The attachment prevents hay or other crops in a windrow from being rolled or kicked forwardly by the baler pick-up mechanism and thus prevents loss of hay while promoting an even flow into the feed auger of the baler.

7 Claims, 4 Drawing Figures

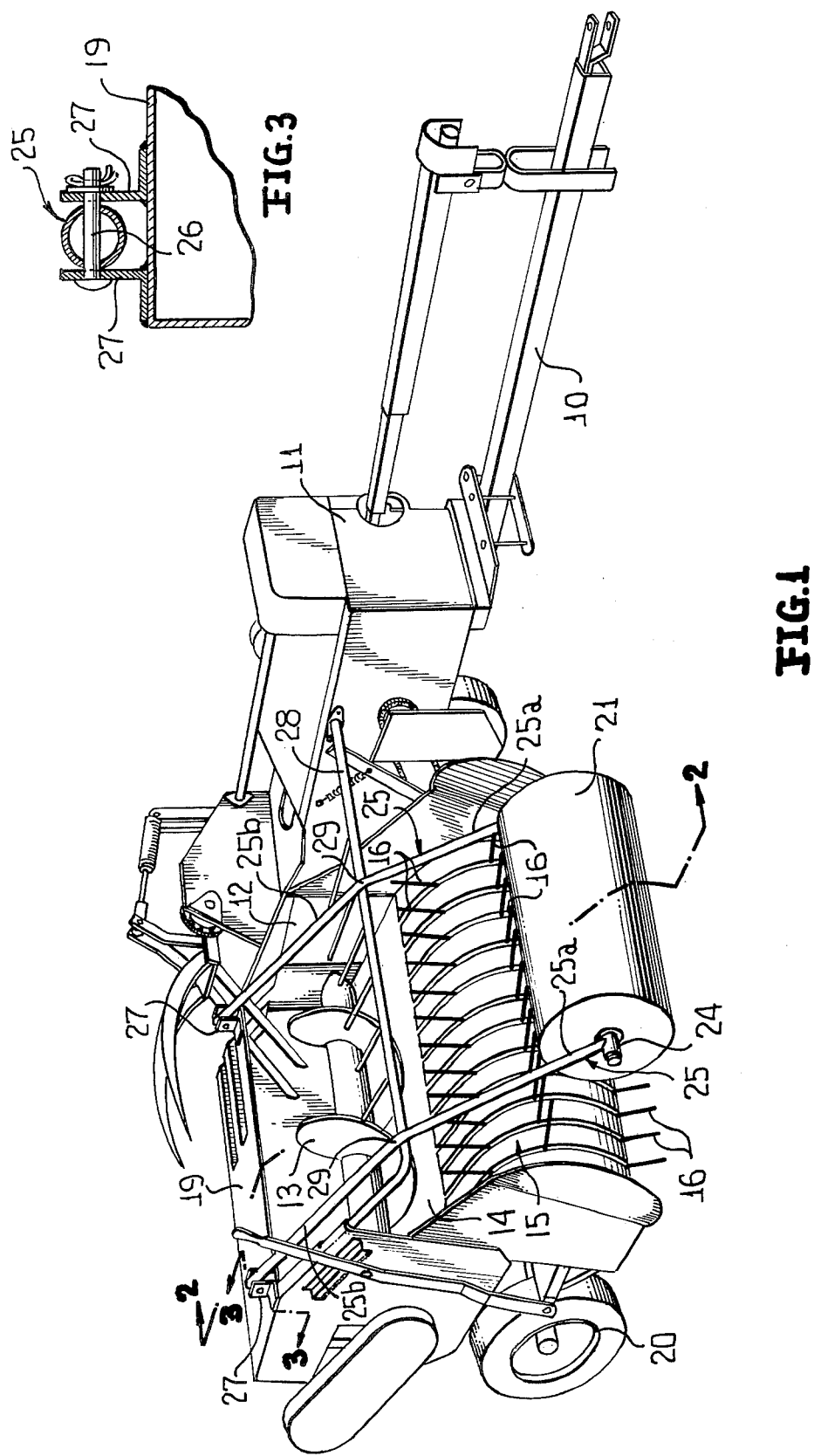

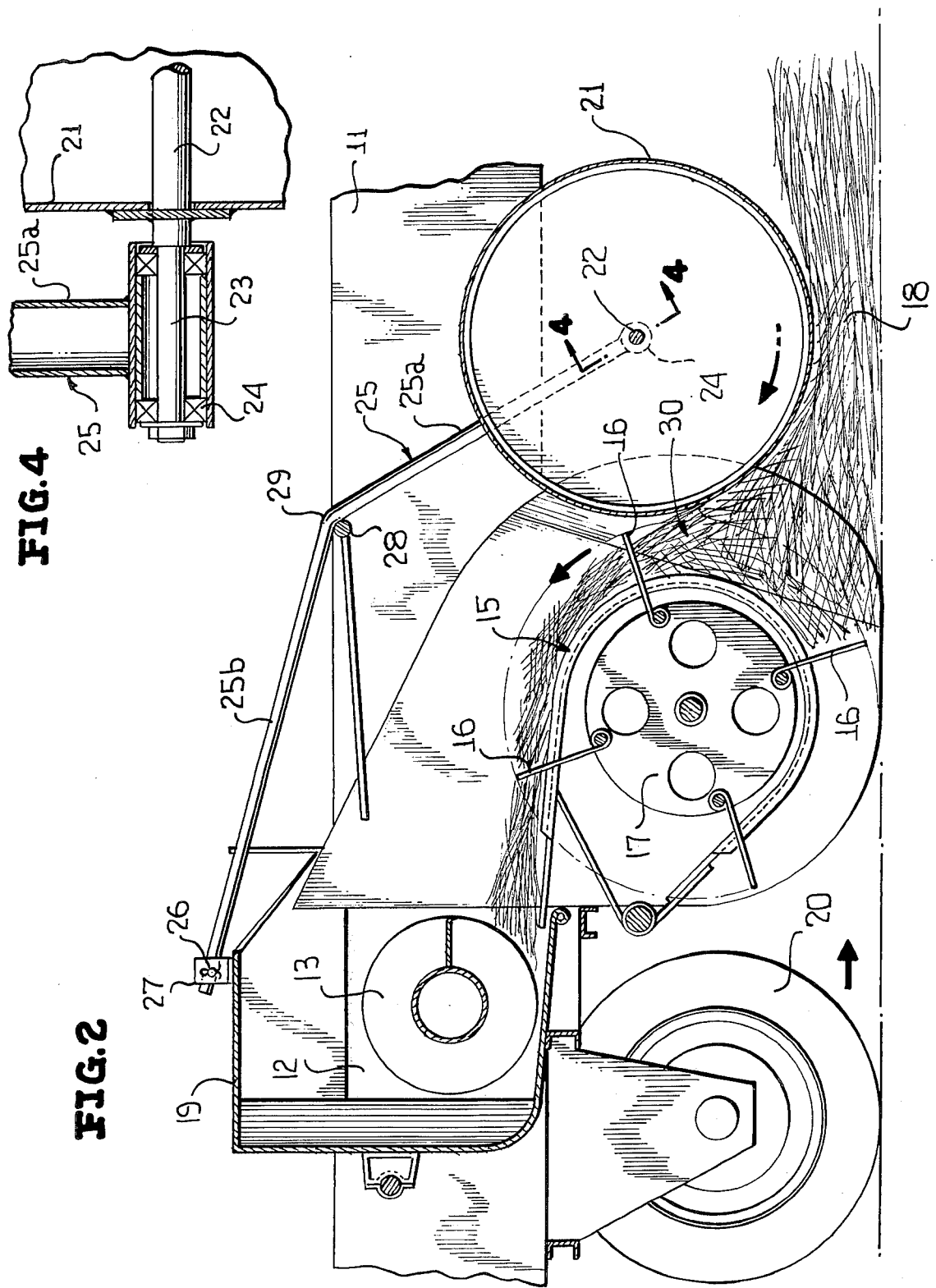

HAY OR CROP SAVING ATTACHMENT FOR MOBILE PICK-UP BALER

BACKGROUND OF THE INVENTION

Mobile pick-up balers for hay or other crops which have been windrowed as well known in the art and an example of the prior art is present in U.S. Pat. No. 3,525,204, issued Aug. 25, 1970, to J. A. Dovichak. Balers of this type are pulled forwardly by a towing vehicle while their pick-up mechanisms are caused to follow a hay windrow or the like. The pick-up mechanism involves counter-rotating teeth or tines which elevate the hay from the windrow and delivers it rearwardly to a transverse axis auger which feeds the hay through a feed opening of a longitudinally extending bale case.

Difficulties are encountered with pick-up balers of the above type particularly when the hay windrow is not uniform, is too thick, or when the hay is too short or has been cut with a rotary mower. In such instances, the counter-rotating pick-up teeth of the forwardly moving baler may kick or tumble a large amount of hay forwardly of the machine rather than picking it up directly. This in turn causes the hay to pile up in the windrow and some hay will fall to either side and be lost. Such lost hay can only be reclaimed by reraking which represents additional labor and cost to the farmer.

The object of the present invention is to provide a very simple attachment device for pick-up balers which will enhance the efficiency thereof by preventing loss of hay and allowing the picking up and baling of the maximum amount of hay regardless of the uniformity of the windrow, whether thick or thin, and regardless of whether the hay or other crop is relatively long or short in stalk length. In any case, the invention will prevent the windrowed hay from being kicked forwardly ahead of the pick-up mechanism or from rolling forwardly and being lost to one side or the other of the windrow and baler. The floating cylinder attachment will hold the hay down in the windrow ahead of the counter-rotating pick-up teeth and will tend to funnel the hay upwardly with the counter-rotating teeth in a continuous and efficient flow pattern. The cylinder attachment is floating and therefore self-adjusting in height as when the windrow is very thick.

The attachment also serves as a visual indicator means which the operator may watch during the advancement of the baler. If he notices the support rods lifting four or five inches above their supporting bar, this will indicate a thick windrow and he can slow down the ground speed of the machine and thus prevent an overfeed of hay into the auger chamber.

Other features and advantages of the invention will become apparent during the course of the following detailed description.

BRIEF DESCRIPTION OF DRAWINGS

FIG. 1 is a perspective view of the invention.

FIG. 2 is an enlarged longitudinal vertical section taken on line 2—2 of FIG. 1.

FIG. 3 is an enlarged fragmentary vertical section taken on line 3—3 of FIG. 1.

FIG. 4 is an enlarged fragmentary vertical section taken on line 4—4 of FIG. 2.

DETAILED DESCRIPTION

Referring to the drawings in detail, wherein like numerals designate like parts throughout, a mobile pick-up baler of the type shown in U.S. Pat. No. 3,525,204 is illustrated including a draft tongue 10 adapted for coupling to a suitable towing vehicle. The tongue 10 is secured to a side longitudinal bale case 11 which receives hay near its rear end through an interior side feed opening 12, delivered by a transverse horizontal axis auger 13 above an elevated floor 14. The auger 13 receives hay from a conventional pick-up mechanism 15 including counter-rotating teeth or tines 16 which project radially from a rotor body 17 in equidistantly circumferentially spaced groups or rows. The counter-rotating teeth 16 continually engage and pick up windrowed hay 18, or other similar crop, as the baler advances along the windrow in accordance with the teachings of the above-mentioned patent. The machine also embodies a hood 19 defining an auger chamber and the machine main frame is carried by a pair of ground wheels 20, all in accordance with Pat. No. 3,525,204. The hay saver attachment forming the subject matter of the invention comprises a relatively large cylinder or roller 21 whose diameter approximates that of the standard pick-up mechanism and whose length will vary depending upon the make and model of the pick-up baler upon which it is employed. In any case, the cylinder 21 spans the front of the pick-up mechanism 15 substantially and is supported independently thereof on a horizontal transverse axis shaft 22 whose end extensions 23, FIG. 4, are journaled in bearing means 24 carried by the forward lower ends of cylinder support arms 25.

The two support arms 25 are parallel and identical in shape and have forward steeply inclined sections 25a and rearward less steeply inclined sections 25b. The rearward ends of the two arms are pivotally attached by pivot pins 26 to rigid bracket means 27 fixedly secured to the top of hood 19. The arms 25 are adapted to swing in a vertical arc about the axes of pins 26 with the cylinder 21 so that the latter may rise and fall in accordance with the relative thickness or thinness of the windrow 18. Downward movement of the support arms 25 and cylinder 21 is limited by positive contact of an existing horizontal cross bar 28 on the pick-up baler with intermediate elbows 29 of the support arms.

When the elbows 29 are resting on the cross bar 28, preferably the bottom of cylinder 21 will be about six inches above the ground and the rear of the cylinder will clear the counter-rotating pick-up teeth 16 by about one inch. These dimensions are not extremely critical and may be slightly varied in some cases, such as to accommodate various forms of hay. For example, the machine can be employed with Coastal Bermuda and Pensacola-Bahia grasses and for peanut and soybean hay, and certain other similar hays.

In operation, as the baler is drawn along the windrow 18, the counter-rotating pick-up teeth 16 will function in the usual manner to lift and transport the hay upwardly and rearwardly into the auger 13. The floating attachment cylinder 21 will prevent the teeth 16 from kicking or rolling the windrowed hay forwardly into a pile or pyramid ahead of the machine where hay will be lost at one or both sides of the windrow requiring after-raking, and where the hay cannot properly be picked up by the machine. The cylinder 21 will hold the windrowed hay down and cooperate with the teeth 16 in funneling the hay into the vertical passage 30 rearwardly of the cylinder 21 and ahead of the pick-up mechanism 15. If the windrow 18 is thick, the cylinder will roll on it and rotate oppositely to the direction of rotation of the teeth 16. If the windrow is thin or sparse, the cylinder 21 will clear the top of the windrow and will not rotate but will still serve to prevent the hay from being kicked or tumbled forwardly and thus piling up ahead of the pick-up mechanism, in accordance with the main objective of the invention. As described, the cylinder 21 can rise and fall with the pivoted support arms 25 but cannot descend below the point at which the elbows 29 engage the fixed bar 28.

The invention assures a uniform flow of hay into the feed auger 13 and the operator, by visually observing the height of arms 25 relative to fixed bar 28, will know the thickness of the windrow and can control the forward speed of the baler accordingly to prevent overfeeding or under-feeding of hay.

The attachment is characterized by simplicity and economy of manufacturing. It does not interfere in any way with the normal utility of the pick-up baler, nor does it require any structural modification of the baler except for providing the brackets 27 on the hood 19. The attachment forming the invention materially increases the usefulness and efficiency of operation of the baler without significantly increasing its cost. The advantages of the invention should now be apparent to those skilled in the art without further detailed description.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a mobile pick-up baler for hay and the like, a counter-rotating pick-up rotor having circumferentially spaced radial pick-up teeth for elevating hay from a windrow and delivering it to a transverse axis auger which feeds the hay into a side mounted bale case, the improvement which comprises a relatively large transverse axis cylinder arranged immediately in advance of said pick-up rotor, and means floatingly supporting said cylinder on the pick-up baler in such a way that the cylinder can rise relative to the pick-up rotor responsive to contact with a thick windrow and is positively prevented from falling below a certain elevation at which the bottom of the cylinder is spaced somewhat from the ground.

2. The structure of claim 1, and said cylinder mounted for free rotation about a horizontal transverse axis on said supporting means.

3. The structure of claim 2, and said supporting means comprising a pair of support arms, said cylinder journaled on the forward ends of said support arms, the rearward ends of said arms being pivotally attached to said baler so that the arms and said cylinder may swing vertically.

4. The structure of claim 3, and an existing transverse horizontal fixed bar on said baler above and near the front of the pick-up rotor and engaging said support arms intermediate their ends to positively limit downward movement thereof with said cylinder.

5. The structure of claim 4, and said support arms being parallel and having steeply inclined forward sections ahead of said pick-up rotor and less steeply inclined sections above the pick-up rotor, there being elbow portions in the support arms between said first and second-named arm sections and said existing fixed bar engaging the support arms at said elbows.

6. The structure of claim 1, and said cylinder having approximately the diameter of said pick-up rotor and disposed on an axis parallel to the axis of said rotor and spanning a major portion of the frontal width of said rotor to form therewith a confined passage for the upward flow of hay lifted from said windrow.

7. The structure of claim 1, and said cylinder when in the lowermost position having a ground clearance of about six inches and being spaced forwardly of the rotating tips of said pick-up teeth about one inch, the cylinder preventing the pick-up teeth from kicking the windrowed hay forwardly so as to pile up the hay ahead of the mobile baler and the cylinder assisting the pick-up rotor in channeling the hay into said auger in an even flow pattern.

* * * * *